US008488791B2

(12) United States Patent
Baechler et al.

(10) Patent No.: US 8,488,791 B2
(45) Date of Patent: Jul. 16, 2013

(54) SECURING TWO-PARTY COMPUTATION AGAINST MALICIOUS ADVERSARIES

(75) Inventors: Gilles Baechler, Onnens (CH); Vladimir Y. Kolesnikov, Jersey City, NJ (US)

(73) Assignee: Alcatel Lucent, Paris (FR)

( * ) Notice: Subject to any disclaimer, the term of this patent is extended or adjusted under 35 U.S.C. 154(b) by 197 days.

(21) Appl. No.: 13/017,449

(22) Filed: Jan. 31, 2011

(65) Prior Publication Data

US 2012/0070000 A1 Mar. 22, 2012

Related U.S. Application Data

(60) Provisional application No. 61/385,315, filed on Sep. 22, 2010.

(51) Int. Cl.
*H04K 1/00* (2006.01)
(52) U.S. Cl.
USPC ............. 380/255; 380/44; 713/171; 713/181; 726/26
(58) Field of Classification Search
None
See application file for complete search history.

(56) References Cited

U.S. PATENT DOCUMENTS

2009/0175443 A1* 7/2009 Kolesnikov et al. ............ 380/44

OTHER PUBLICATIONS

Lindell et al. "An Efficient Protocol for Secure Two-Party Computation in the Presence of Malicious Adversaries" EUROCRYPT 2007, pp. 1-35.*

Goyal et al., "Efficient Two Party and Multi Party Computation Against Covert Adversaries", Advances in Cryptology—EUROCRYPT 2008, vol. 4965, pp. 289-306 Istanbul Turkey (2008).
Jarecki et al., "Efficient Two-Party Secure Computation on Committed Inputs", Advances in Cryptology EUROCRYPT 2007, vol. 4515, pp. 97-114 Barcelona, Spain, (2007).
Mohassel et al., "Efficiency Tradeoffs for Malicious Two-Party Computation", 9th Int'l Conference on Theory and Practice of Public Key Cryptography, vol. 3958, pp. 458-473, New York, NY, (2006).
David P. Woodruff, "Revisiting the Efficiency of Malicious Two-Party Computation", Advances in Cryptology—EUROCRYPT 2007, vol. 4515, pp. 79-96, Barcelona, Spain (2007).
Lindell et al., "An Efficient Protocol for Secure Two-Party Computation in the Presence of Malicious Adversaries", Advances in Cryptology—EUROCRYPT 2007, vol. 4515, pp. 52-78, Barcelona, Spain (2007).

* cited by examiner

*Primary Examiner* — Shewaye Gelagay
(74) *Attorney, Agent, or Firm* — Ryan, Mason & Lewis, LLP

(57) ABSTRACT

Methods and apparatus are provided for securing two-party computations against malicious adversaries. A method is provided for secure function evaluation. The disclosed method is performed by a garbled circuit evaluator for the transfer of private information, and comprises receiving from a constructor (i) s garbled circuits (GCs), wherein each of the GCs having a plurality of input wires; and (ii) commitments for each of the input wires, wherein the commitments comprise $s^2$ pair-wise cryptographic bindings of wire garblings of each given wire in the s GCs; requesting the constructor to reveal a selected check-set of s/2 of the s GCs; and verifying that the check-set was properly constructed using less than all of the commitments. In addition, the disclosed method optionally comprises the step of evaluating the remaining GCs that were not in the check-set.

16 Claims, 3 Drawing Sheets

SECURING TWO-PARTY COMPUTATION AGAINST MALICIOUS ADVERSARIES

CROSS REFERENCE TO RELATED APPLICATION

This application claims priority to U.S. Provisional Application No. 61/385,315, filed Sep. 22, 2010, incorporated by reference herein.

FIELD OF THE INVENTION

The present invention relates generally to techniques for securing electronic transactions and, more particularly, to secure function evaluation (SFE) techniques that provide privacy to the parties of such electronic transactions.

BACKGROUND OF THE INVENTION

Two-party general secure function evaluation (SFE) allows two parties to evaluate any function on their respective inputs x and y, while maintaining the privacy of both x and y. Efficient SFE algorithms enable a variety of electronic transactions, previously impossible due to mutual mistrust of participants. For example, SFE algorithms have been employed in auctions, contract signing and distributed database mining applications. As computation and communication resources have increased, SFE has become truly practical for common use. A malicious SFE model provides a guarantee of complete privacy of the players' inputs.

Fairplay is an exemplary full-fledged implementation of generic two-party SFE with malicious players. See, for example, D. Malkhi et al., "Fairplay: A Secure Two-Party Computation System," USENIX (2004). Fairplay demonstrates feasibility and efficiency of SFE of many useful functions, represented as circuits of up to approximately $10^6$ gates.

While such existing generic two-party SFE algorithms have significantly improved the privacy of two party transactions, a number of limitations remain, which, if overcome, could further improve the efficency, utility and/or security of generic two-party SFE algorithms. For example, traditional approaches require the verification of an opened check-set s/2 garbled circuits (GCs) and all commitments for the pairs of inputs wires in the s/2 opened check-set. A need exists for improved generic two-party SFE algorithms that allow a reduced number of commitments to be verified for the pairs of wires in the opened check-set, while sufficiently protecting the privacy of the parties.

SUMMARY OF THE INVENTION

Generally, methods and apparatus are provided for securing two-party computations against malicious adversaries. According to one aspect of the present invention, a method is provided for secure function evaluation. The disclosed method is performed by a garbled circuit evaluator for the transfer of private information, and comprises receiving from a constructor (i) s garbled circuits (GCs), wherein each of the GCs having a plurality of input wires; and (ii) commitments for each of the input wires of each of s GC's, wherein the commitments comprise $s^2$ pair-wise bindings of wire garblings of each given wire in the s GCs; requesting the constructor to reveal a selected check-set of s/2 of the s GCs; and verifying that the check-set was properly constructed using less than all of the commitments. In addition, the method optionally (i.e., if all checks successfully verify) comprises the step of evaluating the remaining GCs that were not in the check-set.

According to a further aspect of the invention, the commitments may comprise a binding of corresponding garblings for each input wire, of each given circuit C, each bit-value b, and for each pair of generated GCs, $GC_j$ and $GC_{j'}$. Generally, for a given circuit I, the commitment to a given pair (I,J) is opened only if circuit J is in the same set as I.

A response to the request may comprise commitments that are wholly inside the check-set.

A more complete understanding of the present invention, as well as further features and advantages of the present invention, will be obtained by reference to the following detailed description and drawings.

DETAILED DESCRIPTION

The present invention improves upon existing generic two-party SFE algorithms that employ a well-known cut-and-choose GC approach. The existing generic two-party SFE algorithms employ a equality-checker technique, whereby for each input wire 1, of a given circuit C, for each bit-value b, and for each pair of generated GCs, $GC_j$ and $GC_{j'}$, the GC Constructor binds the corresponding garblings, as discussed further below. Generally, the GC Constructor generates $z_{j,j',i,b}$, the commitment to the tuple $(j,j',w_{i,b}^j,w_{i,b}^{j'})$. When the GC Evaluator randomly selects and asks the GC Constructor to reveal the check-set of s/2 GCs, the GC Constructor also opens, and Bob verifies, all of the commitments $z_{j,j',i,b}$ that are wholly inside the check-set (i.e. j and j' are in the check-set). The number of estimated commitments is s(s−1) since there are two bit-values for each input. It is noted that opening a commitment to a given pair does not reveal the bit value.

According to one aspect of the invention, the number of commitments to be verified can be significantly reduced, based on a transitivity property. Thus, the present invention decreases the number of commitments required to ensure consistency of the input values of the Constructor. While the present invention is illustrated herein in the context of a binary implementation, for ease of illustration, the present invention can be generalized to non-binary implementations as well, as would be apparent to a person of ordinary skill in the art.

Figure 1:
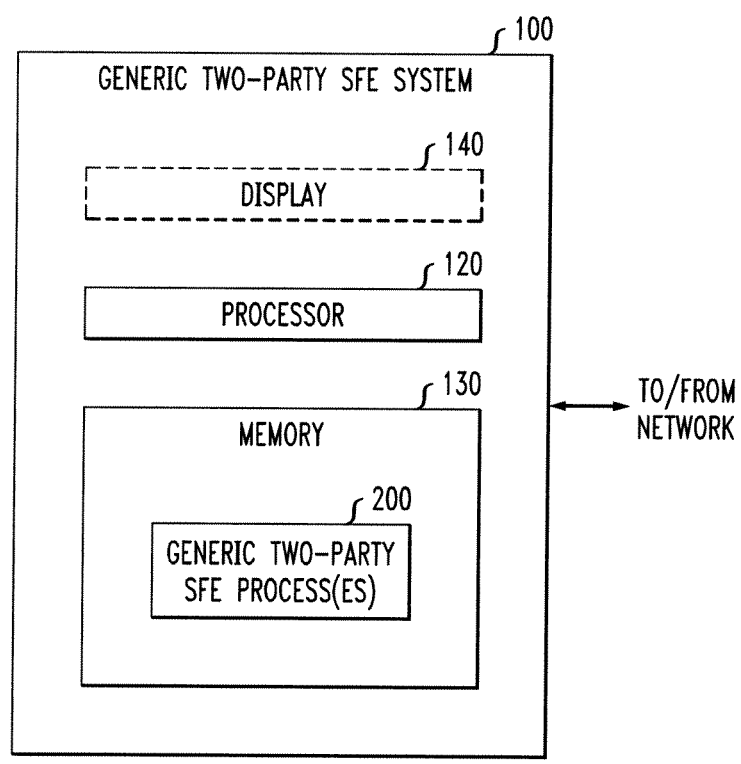
FIG. 1 is a block diagram of an improved generic two-party SFE system that can implement the processes of the present invention.

FIG. 1 is a block diagram of an improved generic two-party SFE system 100 that can implement the processes of the present invention. As shown in FIG. 1, memory 130 configures the processor 120 to implement the generic two-party SFE methods, steps, and functions disclosed herein (collectively, shown as 200 in FIG. 1, and discussed further below in conjunction with FIG. 2). The memory 130 could be distributed or local and the processor 120 could be distributed or singular. The memory 130 could be implemented as an electrical, magnetic or optical memory, or any combination of these or other types of storage devices. It should be noted that each distributed processor that makes up processor 120 generally contains its own addressable memory space. It should also be noted that some or all of computer system 100 can be incorporated into a personal computer, laptop computer, handheld computing device, application-specific circuit or general-use integrated circuit.

Generic Two-Party SFE Algorithms

Existing generic two-party SEE algorithms typically employ Garbled Circuits (GCs). For a detailed discussion of GCs, see, for example, Andrew C. Yao, "Protocols for Secure Computations," Proc. 23rd IEEE Symp. on Foundations of Comp. Science, 160-164, (Chicago, 1982); or Andrew C. Yao," "How to Generate and Exchange Secrets," Proc. 27th IEEE Symp. on Foundations of Comp. Science, 162-167 (Toronto, 1986).

For a detailed discussion of exemplary existing generic two-party SFE algorithms, see, for example, Payman Mohassel and Matthew Franklin, "Efficiency Tradeoffs for Malicious Two-Party Computation," Moti Yung et al., editors, PKC 2006: 9th International Conference on Theory and Practice of Public Key Cryptography, Vol. 3958 of Lecture Notes in Computer Science, 458-473 (New York, N.Y.; Apr. 24-26, 2006); Yehuda Lindell and Benny Pinkas, "An Efficient Protocol for Secure Two-Party Computation in the Presence of Malicious Adversaries," Moni Naor, editor, Advances in Cryptology—EUROCRYPT 2007, Vol. 4515 of Lecture Notes in Computer Science, 52-78 (Barcelona, Spain, May 20-24, 2007); David P. Woodruff, "Revisiting the Efficiency of Malicious Two-Party Computation," In Moni Naor, editor, Advances in Cryptology—EUROCRYPT 2007, Vol. 4515 of Lecture Notes in Computer Science, 79-96 (Barcelona, Spain, May 20-24, 2007); Stanislaw Jarecki and Vitaly Shmatikov, "Efficient Two-Party Secure Computation on Committed Inputs," In Moni Naor, editor, Advances in Cryptolotty—EUROCRYPT 2007, Vol. 4515 of Lecture Notes in Computer Science, 97-114 (Barcelona, Spain, May 20-24, 2007); and/or Vipul Goyal et al., "Efficient Two Party and Multiparty Computation Against Covert Adversaries," In Nigel P. Smart, editor, Advances in Cryptology—EUROCRYPT 2008, Vol. 4965 of Lecture Notes in Computer Science, 289-306 (Istanbul, Turkey, Apr. 13-17, 2008), each incorporated by reference.

Typically, existing generic two-party SFE algorithms use the following, cut-and-choose GC approach. GC constructor Alice generates s (a security parameter) garbled circuits and sends them to GC evaluator Bob. Bob opens half of the garbled circuits and checks that they were correctly constructed. Thereafter, Bob evaluates the remaining circuits and accepts the majority answer. Additionally, for each input wire, Alice also commits to the $s^2$ pairs (as there are 2 bit values) of wire garblings of that wire in the s GCs. $s^2$ is the estimated number of pairs of wires in the GCs. It is noted that the precise number of commitments is $s(s-1)$, which can be estimated as $s^2$ for large values of s. For an exemplary binary implementation, each party commits to an input garbling for each binary value. Thus, the constructor Alice sends the evaluator s circuits and $s^2$ commitments to pairs.

Before Bob evaluates the remaining s/2 GCs, Alice opens the other half to prove that she provided garblings corresponding to the same inputs in all evaluated GCs. This $s^2$ term ($ns^2$ for n-input circuits) is the highest order term in the SFE cost. Generally, the $s^2$ commitments for each input bit are generated and sent to the GC evaluator, in order that the GC evaluator can catch a possibly cheating GC constructor.

Improved Generic Two-Party SFE Algorithm

According to one aspect of the invention, the commitment to the $s^2$ pairs of wire garblings is reduced by a factor of two.

As previously indicated, since it must be ensured that the same input must be provided to all s GCs used in the computation, $s^2$ commitments per each input bit are generated and sent to catch the possibly cheating GC constructor. The disclosed reduction of the number of commitments by a factor of two improves the highest-order term in both communication and computation of secure function evaluation (SFE).

The disclosed exemplary protocol is a modification of Payman Mohassel and Matthew Franklin, "Efficiency Tradeoffs for Malicious Two-Party Computation," (New York, N.Y.; Apr. 24-26, 2006); and Yehuda Lindell and Benny Pinkas, "An Efficient Protocol for Secure Two-Party Computation in the Presence of Malicious Adversaries," (Barcelona, Spain, May 20-24, 2007), fully referenced above and incorporated by reference.

Setting and Preliminaries

Consider, for example, acyclic boolean circuits with arbitrary fan-out. That is, the (single) output of each gate can be used as input to an arbitrary number of gates. It is assumed that the gates $G_1, \ldots, G_k$ of the circuit are ordered topologically. This order (which is not necessarily unique) ensures that the i-th gate $G_i$ has no inputs that are outputs of a successive gate $G_j$, where j>i. A topological order can always be obtained on acyclic circuits, with linear computation.

The present invention is illustrated using the malicious model, where players may arbitrarily deviate from the protocol to try to learn information or to influence the outcome of the computation. Certain attacks, such as the attacker's ability to substitute his input or abort the computation cannot be prevented, and are not considered insecurities. For a detailed discussion and formal definitions of security in the ideal-real simulation paradigm, see for example, Oded Goldreieh, "Foundations of Cryptography: Basic Applications," Vol. 2, (Cambridge University Press, 2004).

The following standard notation is employed: $\epsilon_k$ denotes uniform random sampling, $\|$ denotes concatenation of bit strings. <a,b> is a vector with two components a and b, and its bit string representation is a||b. $W_c = g(W_a, W_b)$ denotes a 2-input gate G that computes function $g:\{0,1\}^2 \to \{0,1\}$ with input wires $W_a$ and $W_b$ and output wire $W_c$.

s is the statistical security parameter, S is an infinite set and $X=\{X_s\}_{s \in S}$ and $Y=\{Y_s\}_{s \in S}$ are distribution ensembles. X and Y are computationally indistinguishable, denoted $X \stackrel{c}{=} Y$, if for every non-uniform polynomial-time distinguisher D and all sufficiently large $s \in S$, $|Pr[D(X_s)=1]-Pr[D(Y_s)=1]|<1/p(|s|)$ for every polynomial p.

A. Oblivious Transfer (OT). The 1-out-of-2 OT is a two-party protocol. The sender Alice has two secrets $m_0, m_1$, and the receiver Bob has a selection bit $i \in \{0,1\}$. At the end of the protocol, Bob learns $m_i$, but nothing about $m_{1-i}$, and Alice learns nothing about i. One-round OT is a widely studied primitive in the standard model. See, for example, Mihir BeHare and Silvio Micah, "Non-Interactive Oblivious Transfer and Applications," CRYPTO '89, 547-557 (Springer-Verlag, 1989).

B. Yao's Garbled Circuit, Semi-Honest Setting. The GC approach is an efficient method of SFE of boolean circuits. Generally, under the GC approach, Circuit constructor Alice first garbles circuit C: for each wire $W_i$, she randomly chooses two secrets, $w_i^0$ and $w_i^1$, where $w_i^b$ is a garbled value, or garbling, of the $W_i$'s value b. It is noted that $w_i^b$ does not reveal b. Further, for each gate $G_i$, Alice creates and sends to circuit evaluator Bob a garbled table $T_i$, with the following property: given a set of garblings of $G_i$'s inputs, $T_i$ allows to recover the garbling of the corresponding $G_i$'s output, and nothing else. Then, garblings of players' inputs are (obliviously) transferred to Bob.

Now, Bob can obtain the garbled output by evaluating the garbled circuit gate by gate, using the tables $T_i$. $W_i$'s garbling is referred to as $w_i^b$ active, if $W_i$ assumes the value b when C is evaluated on the given input. Observe that for each wire, Bob can obtain only its active garbling. The output wires of the circuit are not garbled (or their garblings are published), thus Bob learns (only) the output of the circuit, and no internal wire values. Alice learns the output from (semi-honest) Bob. Correctness of GC follows from the method of construction of tables $T_i$. Neither party learns any additional information from the protocol execution.

Overview of Mohassel-Franklin (ME) Equality-Checker Protocol

The boolean circuit C represents the function $f$ to be evaluated, and x and y are the respective inputs of Alice and Bob. For simplicity, it is assumed that Bob receives $f(x, y)$ and Alice receives nothing: this can be generalized to the case where both parties receive a different output. s is the statistical security parameter.

The GC constructor Alice generates s different GCs, $GC_i, \ldots, GC_s$, and corresponding commitments (e.g., to garblings of Bob's wires) for the subsequent cut-and-choose and committed OT, where Bob opens and verities s/2 circuits, evaluates the other s/2 circuits and accepts the majority answer.

MF discloses an equality-checker technique for preventing Alice from providing different inputs to different copies of the evaluated GCs. Generally, under the equality-checker technique, for each wire i, of the circuit C, each bit-value b, and for each pair of generated GCs, $GC_j$ and $GC_{j'}$, Alice binds the corresponding garblings. That is, Alice generates $z_{j,j',i,b}$, the commitment to the tuple $(j,j',w_{i,b}^j,w_{i,b}^{j'})$. When Bob randomly selects and asks Alice to reveal the check-set of s/2 GCs, Alice also opens, and Bob verifies, the commitments $z_{j,j',i,b}$ that are wholly inside the check-set (i.e. j and j' are in the check-set). Alice then sends to Bob the garbled values corresponding to her inputs in the evaluation-set and opens all commitments $z_{j,j',i,b}$, that are wholly inside the evaluation-set. The two checks allow Bob to verify that, with a high probability, all the inputs provided by Alice correspond to the same value. Indeed, to successfully cheat, Alice must create several bad commitments, and hope that Bob selects the check-set in just the right way. Alice's success probability has been shown to be negligible.

Extension of Mohassel-Franklin (MF) Equality-Checker Protocol

According to one aspect of the invention, the quadratic number of commitments to pairs of garbled values (i.e., $z_{j,j',i,b}$) is reduced, relative to the traditional MF Protocol. Consider the graph of pairwise commitments of Payman Mohassel and Matthew Franklin, "Efficiency Tradeoffs for Malicious Two-Party Computation," (New York, N.Y.; Apr. 24-26, 2006), fully referenced above and incorporated by reference, for a specific input wire of Alice. The vertices of the graph are the circuits (recall that there are s circuits) and the edges represent the commitments connecting the corresponding circuits. The graph of MF is complete. Therefore, it can be shown that any subgraph of size s/2 is connected by the commitments.

The present invention recognizes that this property is maintained for incomplete graphs as well. As discussed further in the following sub-section, an alternative commitments graph is employed by the present invention, with only half of the edges, which is used for the SFE protocol.

In one exemplary implementation of the present invention, Alice and Bob run a coin-tossing protocol to select the check- and evaluation-sets, instead of Bob simply selecting the sets randomly.

Figure 2:
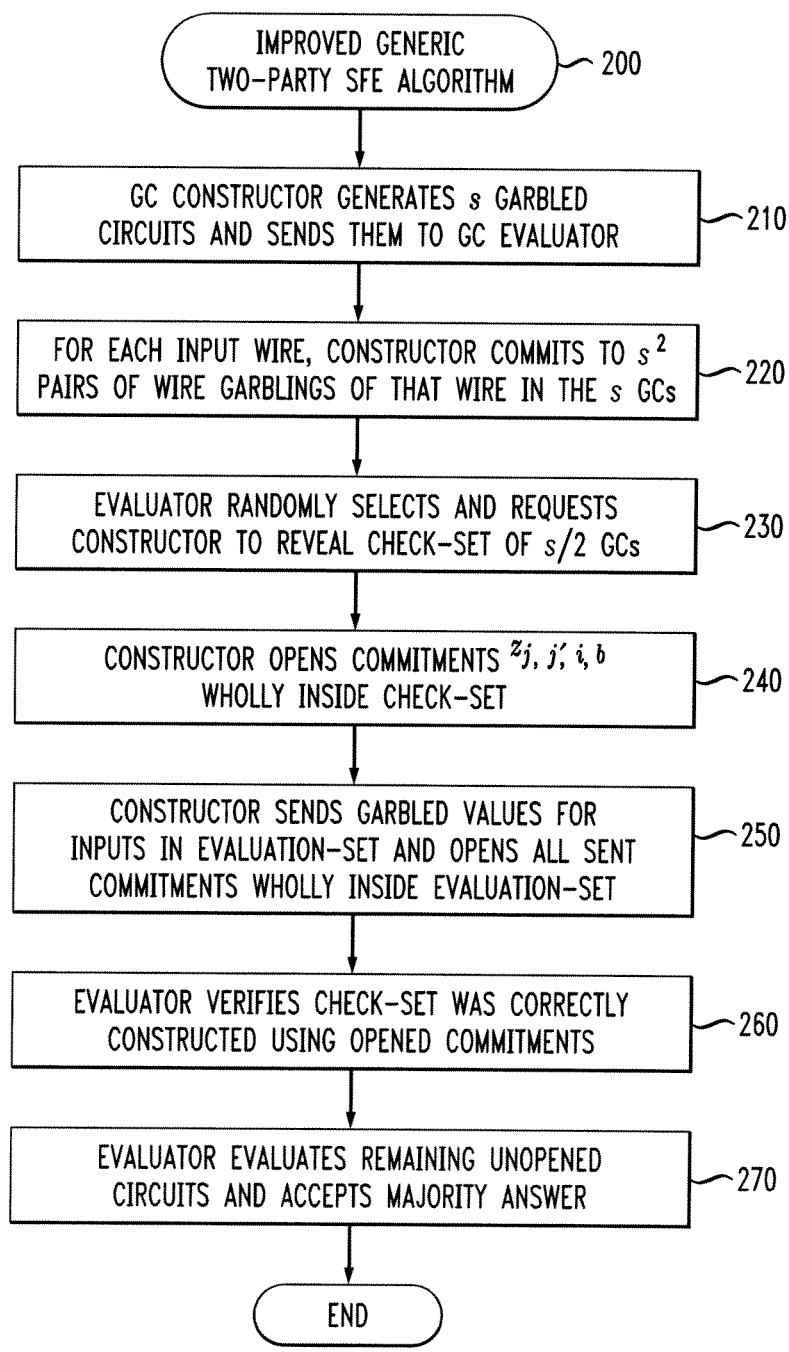
FIG. 2 is a now chart describing an exemplary implementation of an improved generic two-party SFE algorithm incorporating features of the present invention.

FIG. 2 is a flow chart describing an exemplary implementation of an improved generic two-party SFE algorithm 200 incorporating features of the present invention. As shown in FIG. 2, the GC Constructor initially generates s garbled circuits and sends them to the GC Evaluator during step 210. In addition, during step 220, for each input wire, the Constructor also commits to the $s^2$ pairs of wire garblings of that wire in the s GCs. In other words, during step 220, the Constructor binds the corresponding garblings for each input wire i, of the circuit C, each bit-value b, and for each pair of generated GCs, $GC_j$ and $GC_{j'}$. (i.e., the Constructor generates $z_{j,j',i,b}$, the commitment to the tuple $(j,j',w_{i,b}^j,w_{i,b}^{j'})$).

During step 230, the Evaluator randomly selects and requests the Constructor to reveal the check-set of s/2 GCs. The Constructor opens the commitments $z_{j,j',i,b}$, during step 240 that are wholly inside the check-set (i.e. j and j' are in the check-set).

The Constructor sends the Evaluator the garbled values during step 250 corresponding to the inputs in the evaluation-set and opens all sent commitments $z_{j,j',i,b}$ that are wholly inside the evaluation-set. For example, if circuits i and j are opened, the commitments for i and j are also opened. It is noted that the Constructor constructs and sends only the commitments that are represented by edges in the graph (See Reduced Commitment Graph for its construction).

During step 260, the Evaluator verifies that the check-set was correctly constructed using a reduced number of commitments. With the traditional approach, the Evaluator opens s/2 GCs and all commitments for the pairs of wires in the opened check-set. With the present invention, however, all the commitments transmitted (note that not all possible pairs are transmitted, but only half of them) are verified for the pairs of wires in the opened check-set. The reduction is discussed further below in the section entitled "Reduced Commitments Graph."

Finally, during step 270, the Evaluator evaluates the remaining unopened circuits and accepts the majority answer.

In this manner, the Evaluator can verify that, with a high probability, all the inputs provided by the Constructor correspond to the same value.

Generally, the present invention recognizes that the number of commitments to be verified can be reduced, based on a transitivity property. For example, if there are 3 open circuits, i, j and k, there are 3 pairs of circuits (i and j), (j and k) and (i and k). If the garblings of two out of the three exemplary pairs of open circuits are verified, then the final pair must be correct as well and need not be explicitly verified.

Reduced Commitments Graph

Figure 3:
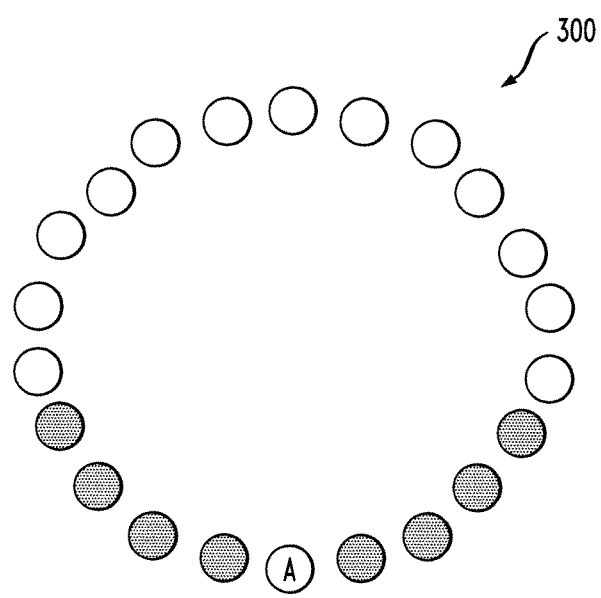
FIG. 3 illustrates a commitments graph for an exemplary random arrangement of 22 GCs, where each node in the graph corresponds to a different GC.

FIG. 3 illustrates a commitments graph 300 for an exemplary random arrangement of 22 GCs, where each node in the graph 300 corresponds to a different GC. The present invention provides techniques for removing edges of the complete graph $G_C$ 300 of order, so that any subgraph of order s/2 remains connected.

s is the number of vertices of the graph 300. For simplicity, it is assumed that s is a multiple of 2 but not of 4 (to provide integer values). The vertices are labeled as $V_0, \ldots, V_{s-1}$. To help visualize the construction, the vertices are placed on a circle in the exemplary embodiment, in order. The distance $dist(V_i,V_j)$ is defined between two vertices $V_i,V_j$ as $min(j-i \pmod s), i-j \pmod s)$.

According to Construction 1, a subgraph G is from the exemplary complete graph $G_C$ 300 (of order s) is obtained by removing all the edges from the graph $G_C$ 300 that connect two vertices $V_i, V_j$, if $dist(V_i, V_j) \leq \frac{1}{2}(s/2-3)$. In total, $s/2-3$ edges are removed for any given vertex and any vertex remains connected to $s/2+2$ vertices. In the illustration of FIG. 3, the $s/2-3$ edges that connect the nodes (vertex) are closest to exemplary node A are removed. The nodes that are closest to A are shown in FIG. 3 with shading.

It can be shown that any subgraph of G of order $s/2$ is connected.

The randomly selected check-set and evaluation-set are of size $s/2$ each. It can be further shown that the probability of malicious Alice cheating while being undetected is at most $$2\binom{\frac{3s}{4}}{\frac{s}{2}} \bigg/ \binom{s}{\frac{s}{2}} \leq 2 \cdot 2^{-\frac{s}{4}}.$$

Exemplary Protocol $com_b$ denotes a perfectly-binding commitment scheme and $com_h$ denotes a perfectly-hiding commitment scheme. j denotes the index of the circuit, i is the index of the wire, b is the bit-value of the wire and $w_{i,b}^j$ the corresponding garbled value of the wire. $z_{j,i,b}$ denotes the commitment to the tuple $(j,i,b,w_{i,b}^j)$. $z_{j,i,b}^A$ refers to Alice's inputs while $z_{j,i,b}^B$ refers to Bob's inputs. Further, $z_{j,j',i,b}$ is the commitment to the tuple $(j,j',w_{i,b}^j,w_{i,b}^{j'})$. If the latter commitment is constructed correctly, it binds the two garbled values for a given wire i and for two different circuits j and j'.

Input: Alice has input $x \in \{0,1\}^n$ and Bob has input $y \in \{0,1\}^n$.

Auxiliary Input: a statistical security parameter s and the description of a circuit $C^0$ such that $C^0(x,y) = f(x,y)$.

Output: Bob receives $f(x,y)$ and Alice receives nothing.

1. Both parties replace $C^0$ with a new circuit C constructed by substituting each input wire of Bob by an XOR-gate with s inputs. The number of Bob's input wires increase to sn. Note that the new input wire values are chosen randomly by Bob, but under the constraint that the output of each XOR-gate corresponds to the value of Bob's inputs.

2. Alice constructs s garbled circuits $GC_1, \ldots, GC_s$. She commits each of her input wires i in each circuit $GC_j$ by generating $z_{j,i,b}^A$'s. Alice also commits to pairs of wire garblings when the edge corresponding to the two circuits are in the graph constructed according to Construction 1. The pairs of commitments $z_{j,j',i,b}$ are sent in random order to hide the corresponding bit-value. Moreover, Alice commits to each garbled value $w_{i,b}^j$ of Bob's input wires i for each circuit $GC_j$ by generating $z_{j,i,b}^B$. Those commitments are generated in ordered pairs so that Bob can check that the values obtained via OT are the correct ones.

3. Alice and Bob engage in oblivious transfers so that Bob can obtain the garbled values corresponding to his inputs. Note that a single oblivious transfer (OT) contains the garbled values corresponding to a given input in all the circuits. Thus the total number of oblivious transfers is ns (the s is due to the use of XOR-gates). Each garbled value to be transferred via OT also includes its witness for the commitment sent in Step 2 of the protocol.

4. Alice sends the garbled circuits and all the commitments (prepared in Step 2) to Bob, 5. Alice and Bob randomly select the circuits to be opened:
   a. Bob chooses a random string $\rho_B \in_R \{0,1\}^s$ and sends $com_h$ $(\rho_B)$ to Alice.
   b. Alice chooses a random string $\rho_A \in \{0,1\}^s$ and sends $com_b$ $(\rho_A)$ to Bob.
   c. Bob decommits and reveals $\rho_B$
   d. Alice decommits and reveals $\rho_A$.
   e. Both parties can compute $\rho = \rho_A \oplus \rho_B$ The circuits for which the corresponding bit in $\rho$ is 1 are defined to be the check-circuits and the circuits for which the corresponding bit in $\rho$ is 0 are defined to be the evaluation-circuits. Also denote the subgraph of G formed by check-circuits as $G_C$ and the subgraph of G formed by evaluation-circuits as $G_E$.

6. Alice proves that she has constructed the circuits well and provided the correct input values:
   a. She reveals each check-circuit. That is, for each circuit $GC_j \in G_C$:
      i. She opens all commitments $z_{j,i,b}^A$.
      ii. She opens all commitments $z_{j,j',i,b}$ for all j, j' such that $GC_j \in G_C$ and $GC_{j'} \in G_C$ and such that there is an edge between $GC_j$ and $GC_{j'}$.
      iii. She opens all commitments $z_{j,i,b}^B$.
   b. For each evaluation-circuit:
      i. She opens all commitments $z_{j,j',i,b}$ for all j,j' such that $GC_j \in G_E$ and $GC_{j'} \in G_E$ and such that there is an edge between $GC_j$ and $GC_{j'}$.
      ii. She opens the commitments $z_{j,i,b}^A$, but only for each b corresponding to her input value (if she committed to her inputs)

7. Bob performs the following checks. If any of them fails, he aborts and outputs $\perp$:
   a. Bob checks that every check-circuit has been constructed correctly:
      i. He checks that the commitments $z_{j,i,b}^A$ for all j such that $GC_j \in G_C$ have been well constructed.
      ii. He checks that the commitments $z_{j,j',i,b}$ for all j, j' such that $GC_j \in G_C$ and $GC_{j'} \in G_C$ and such that there is an edge between $GC_j$ and $GC_{j'}$ have been well constructed.
      iii. He also checks that the commitments $z_{j,i,b}^B$ have been constructed correctly.
      iv. Finally, he checks that each garbled table matches the encrypted inputs and that the garbled circuit corresponds to C.
   b. For every evaluation-circuit:
      i. He checks all the commitments $z_{j,j',i,b}$ provided by Alice.
      ii. He checks all the commitments $z_{j,i,b}^A$ corresponding to Alice's inputs (in case Alice committed to her garbled values)
      iii. He also checks the commitments to his input wires $z_{j,i,b}^B$ (he received the witnesses during the oblivious transfer)

8. If all the checks passed, Bob evaluates all the evaluation-circuits and outputs the majority of the outputs. It might be that in certain circuits the garbled values provided for Alice's inputs or learned by Bob, do not match the tables and so decryption of the circuit fails. In this case, Bob aborts and outputs $\perp$.

System and Article of Manufacture Details

While FIG. 2 shows an exemplary sequence of steps, it is also an embodiment of the present invention that the sequence may be varied. Various permutations of the algorithm are contemplated as alternate embodiments of the invention.

While exemplary embodiments of the present invention have been described with respect to processing steps in a software program, as would be apparent to one skilled in the art, various functions may be implemented in the digital domain as processing steps in a software program, in hardware by circuit elements or state machines, or in combination of both software and hardware. Such software may be employed in, for example, a digital signal processor, application specific integrated circuit, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing, a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method of secure function evaluation performed by a garbled circuit evaluator for the transfer of private information, comprising:
   receiving from a constructor (i) s garbled circuits (GCs), wherein each of said GCs has a plurality n of input wire indices; and (ii) commitments of pairs of input wires corresponding to the same input for each of said n input wire indices of each of said GCs, wherein said commitments comprise pair-wise cryptographic bindings of wire garblings of each given wire index in the s GCs with less than all possible pairs of said given wire index and s−1 other input wires of the same index in the s GCs;
   requesting said constructor to reveal a selected check-set of s/2 of said s GCs; and
   verifying that said check-set was properly constructed using less than all of said commitments.

2. The method of claim 1, further comprising the step of evaluating the remaining GCs that were not in said check-set.

3. The method of claim 1, wherein said commitments comprise a binding of corresponding garblings for each input wire i, of each given circuit C, each bit-value b, and for each pair of generated GCs, $GC_j$ and $GC_{j'}$.

4. The method of claim 1, wherein a response to said requesting step comprises commitments that are wholly inside said check-set.

5. The method of claim 1, wherein, for a given circuit I, the commitment to a given pair (I,J) is opened only if circuit J is in the same set as I.

6. The method of claim 1, wherein said pair-wise cryptographic bindings comprise commitments for half of said pairs of n input wires.

7. A system for secure function evaluation performed by a garbled circuit evaluator for the transfer of private information, comprising:
   a memory; and
   at least one processor, coupled to the memory, operative to:
      receive from a constructor (i) s garbled circuits (GCs), wherein each of said GCs has a plurality n of input wire indices; and (ii) commitments of pairs of input wires corresponding to the same input for each of said n input wire indices of each of said GCs, wherein said commitments comprise pair-wise cryptographic bindings of wire garblings of each given wire index in the s GCs with less than all possible pairs of said given wire index and s−1 other input wires of the same index in the s GCs;
      request said constructor to reveal a selected check-set of s/2 of said s GCs; and
      verify that said check-set was properly constructed using less than all of said commitments.

8. The system of claim 7, wherein said processor is further configured to evaluate the remaining GCs that were not in said check-set.

9. The system of claim 7, wherein said commitments comprise a binding of corresponding garblings for each input wire i, of each given circuit C, each bit-value b, and for each pair of generated GCs, $GC_j$ and $GC_{j'}$.

10. The system of claim 7, wherein a response to said request comprises commitments that are wholly inside said check-set.

11. The system of claim 7, wherein, for a given circuit I, the commitment to a given pair (I,J) is opened only if circuit J is in the same set as I.

12. An article of manufacture for secure function evaluation performed by a garbled circuit evaluator for the transfer of private information, said article of manufacture comprising a machine readable recordable non-transitory medium containing one or more programs which when executed implement the steps of:
   receiving from a constructor (i) s garbled circuits (GCs), wherein each of said GCs has a plurality n of input wire indices; and (ii) commitments of pairs of input wires corresponding to the same input for each of said n input wire indices of each of said GCs, wherein said commitments comprise pair-wise cryptographic bindings of wire garblings of each given wire index in the s GCs with less than all possible pairs of said given wire index and s−1 other input wires of the same index in the s GCs;

requesting said constructor to reveal a selected check-set of s/2 of said s GCs; and verifying that said check-set was properly constructed using less than all of said commitments.

13. The article of manufacture of claim 12, further comprising the step of evaluating the remaining GCs that were not in said check-set.

14. The article of manufacture of claim 12, wherein said commitments comprise a binding of corresponding garblings for each input wire i, of each given circuit C, each bit-value b, and for each pair of generated GCs, $GC_j$ and $GC_{j'}$.

15. The article of manufacture of claim 12, wherein a response to said requesting step comprises commitments that are wholly inside said check-set.

16. The article of manufacture of claim 12, wherein, for a given circuit I, the commitment to a given pair (I,J) is opened only if circuit J is in the same set as I.

* * * * *